United States Patent [19]

Tsuyuguchi et al.

[11] Patent Number: 4,984,224

[45] Date of Patent: Jan. 8, 1991

[54] APPARATUS FOR RECORDING AND/OR ERASING AN INFORMATION SIGNAL ON AND FROM A MAGNETO-OPTICAL DISK WHEREIN THE MAGNETIC BIASING FIELD MEANS IS PART OF A ROTOR MAGNET INCLUDED IN A STEPPING MOTOR

[75] Inventors: Hiroshi Tsuyuguchi; Yasushi Noda, both of Tokyo; Keiji Uehara, Iruma, all of Japan

[73] Assignee: Teac Corporation, Japan

[21] Appl. No.: 432,477

[22] Filed: Nov. 7, 1989

[30] Foreign Application Priority Data

Nov. 10, 1988 [JP] Japan ............................ 63-146840[U]

[51] Int. Cl.$^5$ ...................... G11B 13/04; G11B 11/10; G11B 11/12
[52] U.S. Cl. ................................... 369/013; 360/114; 360/59
[58] Field of Search .................... 369/13; 360/59, 114; 365/122

[56] References Cited

U.S. PATENT DOCUMENTS 4,701,895 10/1987 VanSant ................................ 360/59

FOREIGN PATENT DOCUMENTS 60-226044 11/1985 Japan ...................................... 369/13
61-208653 9/1986 Japan ...................................... 369/13
62-14352 1/1987 Japan ..................................... 360/114

Primary Examiner—Stuart S. Levy
Assistant Examiner—Hoa Nguyen
Attorney, Agent, or Firm—Andrus, Sceales, Starke & Sawall

[57] ABSTRACT

A recording head of a magneto-optical disk apparatus for recording and/or erasing an information signal on and from a magneto-optical disk mounted on the apparatus comprises optical pickup device disposed at a first side of the magneto-optical disk for producing an optical beam such that the optical beam is focused on the first side of the magneto-optical disk, pickup feeding mechanism provided on a frame of the magneto-optical disk apparatus for moving the optical pickup device along a path extending in a radial direction of the disk, a stepping motor disposed at a second side of the magneto-optical disk, the stepping motor having a housing containing a rotor magnet and a stator winding surrounding the rotor magnet, the rotor magnet including a plurality of elongated magnetic parts magnetized to either one of the N-pole and S-pole and arranged with alternate polarity about a rotary axis of the stepping motor such that each of the elongated magnetic parts extends parallel to the rotary axis, the rotor magnet further extending beyond the housing of the stepping motor, and mounting mechanism for mounting the stepping motor on the frame of the apparatus such that the rotor magnet projecting beyond the housing of the stepping motor extends substantially parallel to the disk along the path of the optical pickup device.

5 Claims, 3 Drawing Sheets

FIG. I PRIOR ART

APPARATUS FOR RECORDING AND/OR ERASING AN INFORMATION SIGNAL ON AND FROM A MAGNETO-OPTICAL DISK WHEREIN THE MAGNETIC BIASING FIELD MEANS IS PART OF A ROTOR MAGNET INCLUDED IN A STEPPING MOTOR

BACKGROUND OF THE INVENTION

The present invention generally relates to magneto-optical recording of information on a magneto-optical disk and more particularly to a recording head for recording and/or erasing an information signal on and from a magneto-optical disk by a finely focused optical beam while applying a predetermined magnetic field across the disk.

Generally, a magneto-optical recording and reproducing apparatus records an information on a magneto-optical disk by a recording head which irradiates a finely focused optical beam on a recording surface of the disk to cause a local heating of a magnetic recording medium on the recording surface of the disk while applying a predetermined magnetic field across the disk. When erasing the information already recorded on the disk, on the other hand, the direction of the magnetic field thus established has to be reversed. The recording head having a capability of such an inversion of the magnetic field will be referred to hereinafter a magneto-optical recording head or simply a recording head. As a means for producing such a reversible magnetic field, a permanent magnet or an electromagnet is used commonly, wherein permanent magnet is preferred from the view point of reducing the size of the recording head. When a permanent magnet is used for this purpose, a mechanism for turning the magnet such that the S-pole and the N-pole of the magnet are selectively faced to the recording surface of the disk is needed for changing the direction of the magnetic field.

FIG. 1 shows a typical prior art mechanism for applying such a biasing magnetic field across the magneto-optical disk for the purpose of recording and further for erasing. Referring to the drawing, a permanent magnet bar 2 held rotatably by a bracket 3 is disposed in a vicinity of a magneto-optical disk 1 such that the bar 2 extends in a radial direction of the disk 1 and the the magnet bar 2 is rotated by a motor 5 via a reduction gear system 4. The permanent magnet bar 2 carries the S-pole on its one side and the N-pole on the other side and is turned by 180 degrees when the operational mode of the magneto-optical disk, apparatus is switched between a recording mode and an erasing mode. In one example, the S-pole is brought to face a recording surface of the disk 1 in the recording mode and the N-pole is brought to face the recording surface of the disk 1 in the erasing mode.

In such a prior art head, there is a problem in that a complex construction such as the bracket 3 and the transmission gear 4 is needed and the cost of the head is increased. As a result of the complexity of the mechanism using a number of parts, there is a problem that the parallelism between the magnet bar 2 and the recording surface of the disk 1 tends to be lost unless the parts used in the mechanism is manufactured with high precision. When the parallelism is lost, the distance between the magnet and the disk is changed at the time of recording and at the time of erasing and strength of the magnetic field tends to be changed accordingly. Such a change of the magnetic field may cause poor recording or insufficient erasing. However, such a high manufacturing precision as required for the prior art recording head increases the cost of the head further. Further, as a result of use of the transmission gear system 4, the turning over of the magnet bar 2 is slow and produces noise during its operation.

When the magnet bar 2 is mounted directly on a rotary shaft of a motor 5, on the other hand, there is a problem in that the magnet bar 2 is tend to be mounted with offset with respect to the real center of the rotary shaft and the magnet bar 2 is rotated with eccentricity. When such an eccentricity occurs in the rotation of the magnet bar 2, the strength of the magnetic field is changed at the time of recording and at the time of erasing similarly to the foregoing case. In order to eliminate such an eccentricity, a delicate and time-consuming adjusting procedure is necessary.

SUMMARY OF THE INVENTION

Accordingly, it is a general object of the present invention to provide a novel and useful recording head of a magneto-optical disk apparatus wherein the foregoing problems are eliminated.

Another and more specific object of the present invention is to provide a recording head of a magneto-optical disk apparatus comprising a mechanism for applying a reversible magnetic field to a magneto-optical disk for recording and for erasing, wherein the head has a simple construction and can be constructed with cheap cost.

Another object of the present invention is to provide a recording head of a magneto-optical disk apparatus wherein the direction of a magnetic field applied across a magneto-optical disk can be reversed with substantially an identical field strength at the time of recording and at the time of erasing, and the recording and erasing of information signal on or from the magneto-optical disk is performed reliably.

Another object of the present invention is to provide a recording head of a magneto-optical disk apparatus for recording and/or erasing an information on and from a magneto-optical disk comprising a permanent magnet for applying a magnetic field across the disk and a stepping motor for turning the permanent magnet so as to reverse the direction of the magnetic field at the time of recording and at the time of erasing, wherein the permanent magnet is provided as an extension of a rotor magnet of the motor. According to the present invention, assembling work for mounting a separate permanent magnet on a shaft of the motor, or adjustment work for achieving alignment between a central axis of the permanent magnet and the rotary shaft of the motor can be eliminated and the cost of the device can be reduced. Further, as a result of elimination of hitherto used gear transmission system and a bracket for holding the magnet, the number of parts used in the head is reduced and the problem of misalignment between the magnet and disk associated with the complex mechanism is eliminated. Further, the switching between a recording mode and an erasing mode can be made quickly without producing noise.

Other objects and further features of the present invention will become apparent from the following detailed description when read in conjunction with attached drawings.

DETAILED DESCRIPTION

Figure 1:
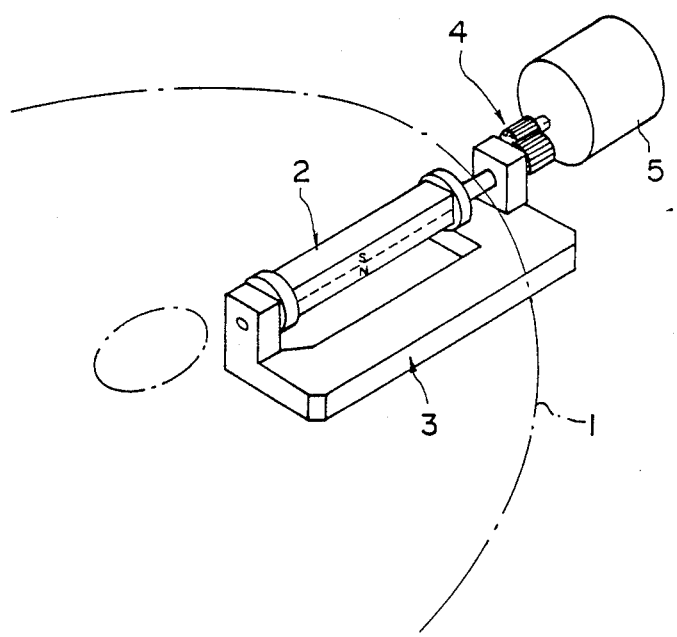
FIG. 1 is a perspective view showing a part of a prior art recording head of a magneto-optical disk apparatus.
Figure 2:
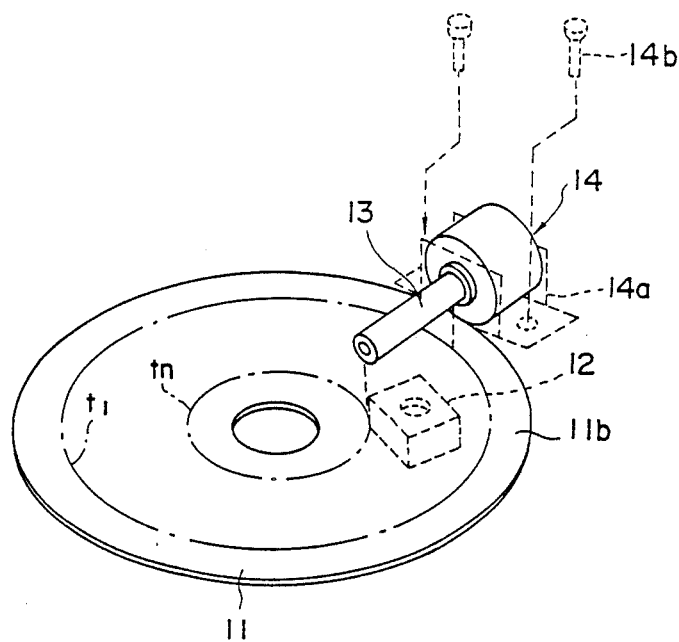
FIG. 2 is a perspective view showing a recording head according to an embodiment of the present invention.

FIG. 2 shows a perspective view of the recording head according to an embodiment of the present invention in a state that a magneto-optical disk 11 is mounted on a magneto-optical disk apparatus. As can be seen from FIG. 2, the head comprises an optical pickup device 12 disposed below the disk 11a and a cylindrical magnet body 13 disposed above the disk 11a. As is usual, the pickup device 12 is moved by a known carriage mechanism 12a mounted on a part 20 of a frame of the magneto-optical disk apparatus and irradiates a bottom side 11a of the optical disk 11a by a finely focused optical beam. On the other hand, the magnetic body 13 produces a magnetic field to be applied across the disk 11a such that a magnetic recording medium on the disk 11 is magnetized according to the direction of the magnetic field when heated by the optical beam. As can be seen in FIG. 2, the cylindrical magnet body 13 extends in a radial direction of the disk 11 for an extent covering a recording area of the disk 11 defined by an outermost track $t_1$ and an innermost track $t_n$.

In order to reverse the direction of the magnetic field for erasing, the magnet body 13 is turned by a stepping motor 14. The feature of the present invention is in that the magnet body 13 itself forms a part of the rotor magnet of the stepping motor 14. In other words, the rotor magnet of the motor 14 surrounded by an annular stator winding 15 in the housing 14' of the motor 14 is projected outwards beyond the housing 14' as the magnet body 13 as shown in a side view of FIG. 3. Thus, the magnet body 13 is rotated responsive to energization of the motor 14 by a driving circuit (not shown). Note that the motor 14 is mounted on a part 20' of the frame of the magneto-optical disk apparatus by a mounting bracket 14a and a mounting screw 14b.

Figure 3:
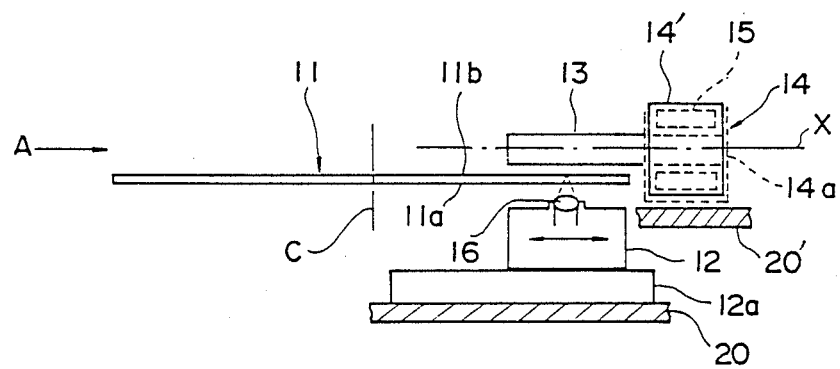
FIG. 3 is a side view showing the head of FIG. 2.

The mounting bracket 14a and the mounting screw 14b are adjusted such that the rotational axis of the motor 14 represented by X in FIG. 3 extends parallel to the disk 11 and such that the axis X coincides with the path of the optical pickup unit 12. More in detail, the rotary axis X coincides with a path of the focused optical beam on the disk 11 as will be clearly seen from FIG. 4 to be described below.

Figure 4:
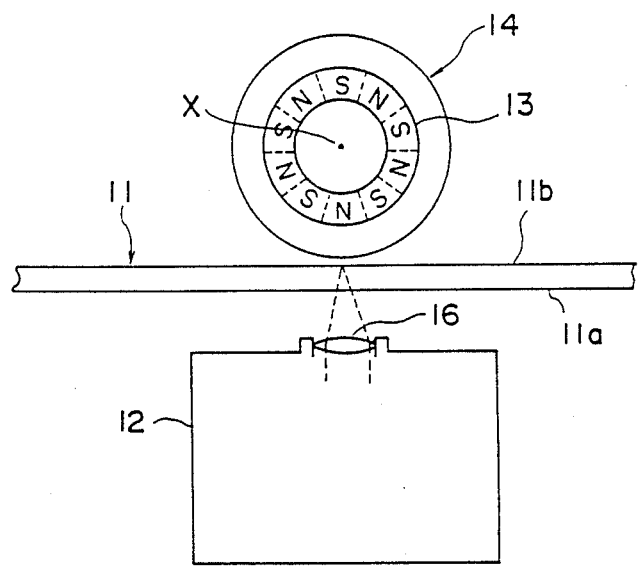
FIG. 4 is an end view showing the head of FIG. 2.

FIG. 4 shows a cross section of the magnet body 13 in detail. As the magnet body 13 forms the rotor of the stepping motor 14, the inside of the magnet body 13 is divided into a number of sectors magnetized alternately to the N-pole and S-pole in corresponding to the stepped rotation of the motor 14. In other words, the plurality of magnetized sectors are arranged symmetrically about a rotary axis X of the motor 14. In the illustrated example, the magnetic body 13 is divided into ten such sectors and responsive to a stepwise rotation of the rotor or magnet body 13 by an angle of 36 degrees, which in turn corresponding to a unit rotational angle of the stepping motor 14, the magnet pole facing the disk 11a is reversed. For example, the N-pole is directed to the disk 11a for recording and the S-pole is directed to the disk for erasing.

Figure 5:
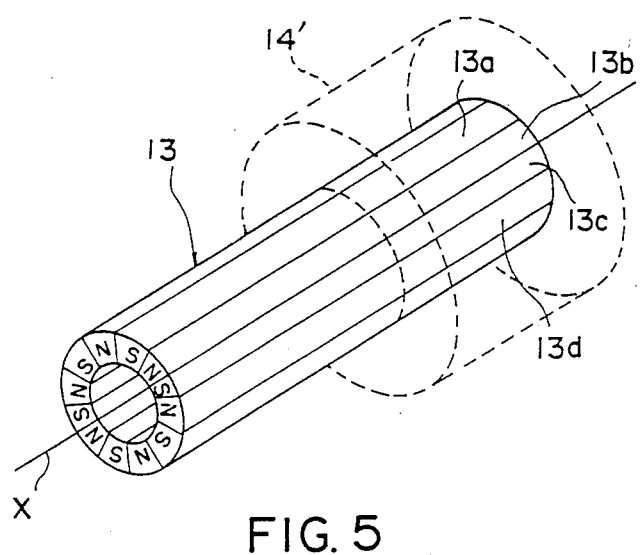
FIG. 5 is a perspective view showing a magnet body used in the head of FIG. 2.

FIG. 5 shows the magnet body 13 in perspective. As can be seen in FIG. 5, each of the sectors in FIG. 4 forms an elongated part 13a–13d exiting in the direction of the axis X. Note that the rear end of the magnet body 13 is accommodated in the motor housing 14'.

By irradiating the focused optical beam by the optical pickup device 12, the part of the disk irradiated by the optical beam is heated above the Curie point of the magnetic recording medium (not shown) covering the surface 11a or 11b of the disk and the magnetic recording medium is magnetized according to the applied magnetic field. Thus, when recording a data, the optical beam is produced intermittently responsive to a binary information data to be recorded while directing the N-pole of the magnet body 13 to the disk 11a and a downwards magnetization is formed in the recording medium intermittently in correspondence to the supplied binary data. When erasing the recorded data, on the other hand, the optical pickup device 12 is energized continuously while directing the S-pole of the magnet body to the disk 11a. The inversion of the magnetic polarity is achieved simply by rotating the magnet body 13 by 36 degrees which in turn is caused by supplying a single drive pulse to the motor 14 from the foregoing not-illustrated drive circuit. As a result, an upward magnetization is formed in the recording medium for the entire track of the disk 11a. Of course, the N-pole and the S-pole may be reversed in the foregoing recording and erasing procedure.

Thus, the switching between the recording mode and the erasing mode is made extremely fast as the magnet body 13 is directly driven by the stepping motor 14. Further, the magnet body 13 is disposed with an exact relationship with respective to the disk 11a by mounting the motor 14 correctly on the frame 20 of the apparatus. Such an exact mounting is achieved easily by adjusting the mounting bracket 14a and the mounting screw 14b. Note that the complicated adjusting for achieving the axial alignment between the magnet body 13 and the rotary shaft of the motor 14 is eliminated. Further, the noise produced by the transmission gear is eliminated. The number of sectors in the magnet body 13 is not limited to ten.

Further, the present invention is not limited to these embodiments but various variations and modifications may be made without departing from the scope of the invention.

What is claimed is:

1. An apparatus for recording and/or erasing an information signal on and from a magneto-optical disk mounted on the apparatus, comprising:

optical pickup means disposed at a first side of the magneto-optical disk for producing an optical beam such that the optical beam is focused on the first side of the magneto-optical disk;

pickup feeding means provided on a frame of the magneto-optical disk apparatus for moving the optical pickup means along a path extending in a radial direction of the disk;

a stepping motor disposed at a second side of the magneto-optical disk, said stepping motor having a housing containing a rotor magnet and a stator winding surrounding the rotor magnet, said rotor magnet comprising a plurality of elongated magnetic parts magnetized to either one of the N-pole and S-pole and arranged with alternate polarity about a rotary axis of the stepping motor such that each of the elongated magnetic parts extends parallel to the rotary axis, said rotor magnet further extending beyond the housing of the stepping motor to provide a magnetic biasing field to the disk during said recording and/or erasing; and mounting means for mounting the stepping motor on the frame of the apparatus such that the rotor magnet projecting beyond the housing of the stepping motor extends substantially parallel to the disk along said path of the optical pickup means.

2. A recording head as claimed in claim 1 in which said plurality of elongated magnetic parts form body.

3. A recording head as claimed in claim 1 in which said rotor magnet extending beyond the housing of the motor encompasses an outermost track and an innermost track on the disk.

4. A recording head as claimed in claim 1 in which said mounting means holds the stepping motor such that the rotary axis of the motor coincides with a path formed on the disk by the focused optical beam responsive to the movement of the optical pickup means.

5. A magnetic biasing device for recording and erasing an information on and from a rotary magneto-optical disk in conjunction with an optical beam focused on the disk, said device comprising:

a stepping motor disposed at a side of the magneto-optical disk, said stepping motor having a housing containing a rotor magnet and a stator winding surrounding the rotor magnet;

said rotor magnet comprising a plurality of elongated magnetic parts magnetized to either one of the N-pole and S-pole and arranged with alternate polarity about a rotary axis of the stepping motor such that each of the elongated magnetic parts extends parallel to the rotary axis, said rotor magnet further extending beyond the housing of the stepping motor for a length sufficient to encompass a radial extension of the magneto-optical disk between an outermost track and an innermost track.

* * * * *

UNITED STATES PATENT AND TRADEMARK OFFICE
CERTIFICATE OF CORRECTION

PATENT NO. : 4,984,224

DATED : January 8, 1991

INVENTOR(S) : HIROSHI TSUYUGUCHI ET AL

It is certified that error appears in the above-identified patent and that said Letters Patent is hereby corrected as shown below:

Claim 2, column 5, line 15, after "form" insert -- a cylindrical magnetic --.

Signed and Sealed this

Twenty-eighth Day of July, 1992

*Attest:*

DOUGLAS B. COMER

*Attesting Officer*   *Acting Commissioner of Patents and Trademarks*